(12) United States Patent
Taniguro et al.

(10) Patent No.: US 9,139,790 B2
(45) Date of Patent: *Sep. 22, 2015

(54) METHOD FOR TREATING BIOMASS MATERIAL AND METHOD FOR USING HEAT ENERGY

(75) Inventors: Katsumori Taniguro, Nasushiobara (JP); Kazunori Iwabuchi, Utsunomiya (JP)

(73) Assignee: Katsumori Taniguro, Nasushiobara-shi, Tochigi (JP)

( * ) Notice: Subject to any disclaimer, the term of this patent is extended or adjusted under 35 U.S.C. 154(b) by 630 days.

This patent is subject to a terminal disclaimer.

(21) Appl. No.: 13/500,020

(22) PCT Filed: Sep. 17, 2010

(86) PCT No.: PCT/JP2010/066158
§ 371 (c)(1),
(2), (4) Date: Apr. 3, 2012

(87) PCT Pub. No.: WO2011/043181
PCT Pub. Date: Apr. 14, 2011

(65) Prior Publication Data
US 2012/0193212 A1  Aug. 2, 2012

(30) Foreign Application Priority Data

Oct. 7, 2009 (JP) ................................ 2009-233054
Dec. 25, 2009 (JP) ................................ 2009-294439

(51) Int. Cl.
*C10B 49/02* (2006.01)
*C10B 57/00* (2006.01)
(Continued)

(52) U.S. Cl.
CPC . *C10L 5/44* (2013.01); *C05F 17/00* (2013.01); *C05F 17/02* (2013.01); *C10B 49/02* (2013.01);
(Continued)

(58) Field of Classification Search
CPC ........ C10B 49/02; C10B 57/00; C10B 57/02; C10B 57/04; C10B 57/07; C10L 5/42; C10L 5/442; C10L 5/444; C10L 5/445; C10L 5/447
USPC ...................... 201/1, 21, 25, 36; 44/605, 606; 588/400, 405; 435/277
See application file for complete search history.

(56) References Cited

U.S. PATENT DOCUMENTS 4,135,908 A   1/1979  Widmer
4,291,636 A * 9/1981  Bergsten et al. .............. 110/346
(Continued)

FOREIGN PATENT DOCUMENTS

CN   1917941    2/2007
EP   0463546    1/1992
(Continued)

OTHER PUBLICATIONS

Hellebrand et al., "Carbon monoxide from composting due to thermal oxidation of biomass", Journal of Environmental Quality, American Society of Agronomy, Crop Science Society of America and Soil Science of America, US, vol. 37, No. 2, Jan. 1, 2008, pp. 592-598.

(Continued)

*Primary Examiner* — In Suk Bullock
*Assistant Examiner* — Jonathan Miller
(74) *Attorney, Agent, or Firm* — Drinker Biddle & Reath LLP

(57) ABSTRACT

A method of treating biomass material includes: placing biomass material in a container; then setting an initial condition of the container including (a) an oxygen containing atmosphere, (b) a temperature range from 55 degree Celsius to 80 degree Celsius,(c) a pressure range from atmospheric pressure to 15 atmospheric pressure, and (d) carbon monoxide concentration equal to or greater than 100 ppm; increasing temperature of the biomass material over 80 degree Celsius; setting a continuation condition including (i) the oxygen containing atmosphere, (ii) the pressure range from atmospheric pressure to 15 atmospheric pressure, and (iii) a carbon monoxide concentration equal to or greater than 100 ppm; and maintaining the continuation condition, in order to spontaneously increase temperature of the biomass material over at least 150 degree Celsius, and to achieve volume reduction or carbonization of the biomass material.

10 Claims, 11 Drawing Sheets

(51) Int. Cl.
*C10L 5/42* (2006.01)
*C10L 5/44* (2006.01)
*C10B 57/04* (2006.01)
*C10B 57/02* (2006.01)
*C05F 17/00* (2006.01)
*C05F 17/02* (2006.01)
*C10L 9/08* (2006.01)
*C02F 11/06* (2006.01)

(52) U.S. Cl.
CPC ............... *C10B 57/02* (2013.01); *C10B 57/04* (2013.01); *C10L 5/42* (2013.01); *C10L 9/086* (2013.01); *C02F 11/06* (2013.01); *C10L 2200/0281* (2013.01); *C10L 2290/06* (2013.01); *C10L 2290/08* (2013.01); *C10L 2290/141* (2013.01); *C10L 2290/145* (2013.01); *C10L 2290/26* (2013.01); *C10L 2290/46* (2013.01); *C10L 2290/565* (2013.01); *C10L 2290/58* (2013.01); *C10L 2290/60* (2013.01); *F23G 2201/40* (2013.01); *F23G 2202/30* (2013.01); *F23G 2209/261* (2013.01); *F23G 2209/262* (2013.01); *F23G 2900/7003* (2013.01); *Y02E 50/10* (2013.01); *Y02E 50/30* (2013.01); *Y02W 30/43* (2015.05)

(56) References Cited

U.S. PATENT DOCUMENTS

| | | | |
|---|---|---|---|
| 4,333,757 | A | 6/1982 | Kurtzman, Jr. |
| 4,364,745 | A * | 12/1982 | Weil .................. 48/209 |
| 5,338,442 | A * | 8/1994 | Siskin et al. ............ 208/435 |
| 6,699,708 | B1 | 3/2004 | Muller et al. |
| 8,361,186 | B1 * | 1/2013 | Shearer et al. .............. 71/32 |
| 8,500,829 | B2 * | 8/2013 | Siskin et al. .............. 44/605 |
| 2002/0040864 | A1 * | 4/2002 | Serio et al. .............. 208/50 |
| 2004/0016274 | A1 | 1/2004 | Rudas |
| 2005/0108928 | A1 | 5/2005 | Sparks |
| 2007/0160524 | A1 | 7/2007 | Yoshida |
| 2008/0072478 | A1 * | 3/2008 | Cooper .................... 44/606 |
| 2010/0112242 | A1 * | 5/2010 | Medoff .................... 428/22 |

FOREIGN PATENT DOCUMENTS

| | | |
|---|---|---|
| EP | 1854775 | 11/2007 |
| EP | 2275394 | 1/2011 |
| JP | 1-310799 | 12/1989 |
| JP | H08-283086 | 10/1996 |
| JP | 10-183135 | 7/1998 |
| JP | 2000-46472 | 2/2000 |
| JP | 2000-297917 | 10/2000 |
| JP | 2001-137806 | 5/2001 |
| JP | 2003-171195 | 6/2003 |
| JP | 2003-200139 | 7/2003 |
| JP | 2004-313858 | 11/2004 |
| JP | 2006-55761 | 3/2006 |
| JP | 2006-198566 | 8/2006 |
| JP | 2008-253875 | 10/2008 |
| JP | 2009-249240 | 10/2009 |
| WO | 01/10796 | 2/2001 |
| WO | 02/34694 | 5/2002 |
| WO | 2004/029001 | 4/2004 |
| WO | 2005/063946 | 7/2005 |
| WO | 2005/077514 | 8/2005 |
| WO | 2009/125670 | 10/2009 |

OTHER PUBLICATIONS

Schade et al., "CO emissions from degrading plant matter", Tellus B., vol. 51, No. 5, Nov. 1, 1999, pp. 889-908.

U.S. Office Action dated Oct. 2, 2013 that issued in U.S. Appl. No. 12/936,064 including Double Patenting Rejections on pp. 2-4.

U.S. Office Action dated Jul. 17, 2014 that issued in U.S. Appl. No. 12/936,064 including Double Patenting Rejections on pp. 5-7.

U.S. Office Action dated Jun. 5, 2015 that issued in U.S. Appl. No. 12/936,064 including Double Patenting Rejections on pp. 3-5.

* cited by examiner

Before the Exothermic Reaction

After the Exothermic Reaction

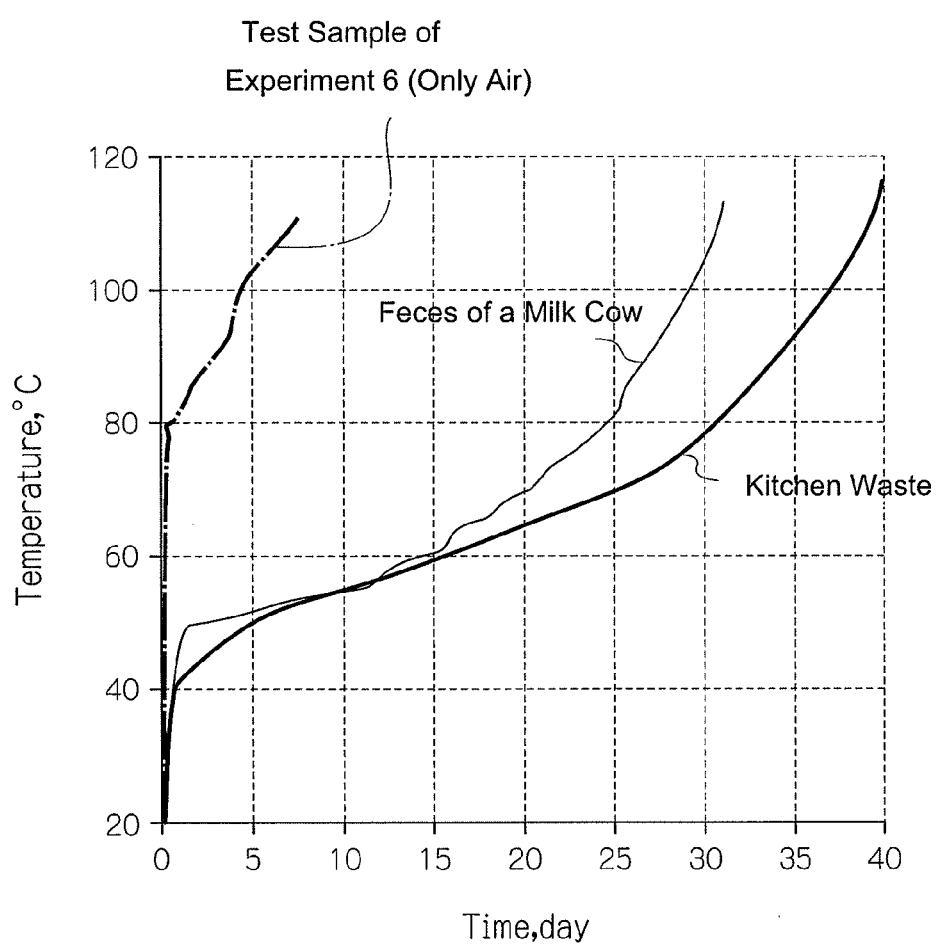

METHOD FOR TREATING BIOMASS MATERIAL AND METHOD FOR USING HEAT ENERGY

FIELD OF THE INVENTION

This invention relates to a method of treating biomass material and method of utilizing heat energy. In particular, this invention relates to the method of treating the biomass material and the method of utilizing the heat energy generated by the method of treating the biomass material to achieve volume reduction or carbonization of biomass material, such as food scraps, livestock excreta, agricultural waste products, marine waste products and forest waste products, at extremely low cost.

BACKGROUND ART

With increase in recognition of recycling usage of biological resources, a lot of kinds of organic wastes have recently been composted and reduced to the earth as resource. Livestock excreta which is feces of the livestock and food wastes such as food scraps (hereinafter these are collectively referred to as "feces of the livestock and the like") that are most expected to be composted and/or resourced, often has high moisture, or so-called in a quagmire state, at the time of generation. For such feces of the livestock and the like, there are difficulties, such as that oxygen is hardly introduced inside the feces of the livestock and the like because of the quagmire state, that the biochemical reaction by the ordinary microbial degradation is difficult to occur, and that the feces of livestock and the like are difficult to be composted. As a result, conventionally, a method which reduces a water content ratio in order to easily take in the oxygen inside the feces of the livestock has been adapted.

As one of the means to reduce the water content ratio, there is a method to provide heat energy, air distribution and the like to the organic waste. However, such a method is not realistic due to an issue of the cost. In addition, as another means, as in the case of the feces of the livestock which are the livestock excreta, there is a method to mix agricultural by-products, such as sawn wood, rice straws, rice husk and the like, with the organic waste. This method reduces the moisture contained in the organic waste and, as a result, to ease the airflow to promote the biochemical reaction by microbial degradation. However, the agricultural by-products may be difficult to procure in some regions, or the cost for procuring the agricultural by-products may increase. Moreover, even when the agricultural by-products can be obtained, the cost may further increase due to the additional processing of the agricultural by-products. Furthermore, in this method, there is a difficulty that the mixture of such agricultural by-products causes an increase in costs as the total amount of treatment increases.

It has been considered to reduce the volume of the organic waste and return to the natural world without composting and resourcing the organic waste. However, even in that case, the water content ratio must be decreased for the organic waste in the quagmire state. This results in the problem similar to the above. Moreover, when the water content ratio of the organic waste in the quagmire state is simply lowered and dried, the reaction for composting the waste by the microbial degradation does not occur. Therefore, the dried organic waste would return to the original organic waste in the quagmire state when returned to the natural world. Moreover, in this method, cost for sewage process similar to those for human excreta cannot be incurred.

On the other hand, patent document 1 proposes a method of treating the waste to achieve volume reduction or carbonization of the waste by pressurizing and heating up the waste including food scraps in a steam kiln. Patent document 2 proposes a method of controlling the supplied amount of air in a gas furnace so that amount of carbon monoxide, which is generated by partial combustion of municipal waste, is maximum. Patent document 3 discloses a dry method of organic products and the like that monitors concentration of carbon monoxide included in an atmosphere gas, which contacts to a dray product, and that maintains the concentration of carbon monoxide at a predetermined value over 10 ppm and below 100 ppm. Patent document 4 proposes a mixture method of kitchen waste performing wet combustion treatment process. The wet combustion treatment process produces slurry by mashing kitchen waste and mixing the mashed kitchen waste with sewage water, pressurizes the slurry by high-pressure pump and feeds high-pressure gas including oxygen or high-pressure air into the slurry, and heats up the pressurized slurry by temperature at which kitchen waste in the pressurized slurry is oxygenized. Patent Document 5 proposes subcritical water degradative treatment method that executes subcritical water degradative treatment at reaction temperature of 130-374 degrees Celsius and reaction pressure over saturated vapor pressure of the reaction temperature.

PRIOR ART DOCUMENT

[Patent Document 1] Japanese Laid-Open Patent Application No. 2001-137806
[Patent Document 2] Japanese Laid-Open Patent Application No. 2000-297917
[Patent Document 3] Japanese Laid-Open Patent Application No. 2000-46472
[Patent Document 4] Japanese Laid-Open Patent Application No. H01-310799
[Patent Document 5] International Patent Application Publication No. WO2005/077514 Pamphlet

SUMMARY OF THE INVENTION

Problems Solved by the Invention

However, processing cost of any method of the above patent documents is expensive because it is necessary to use high processing temperature. Specifically, it is necessary for patent document 1 to use high processing temperature of 150-200 degrees Celsius, and it is necessary for patent document 2 to use high processing temperature of 450-900 degrees Celsius. Further, it is necessary for patent document 3 to use high processing temperature of 350-600 degrees Celsius, it is necessary for patent document 4 to use high processing temperature of 100-300 degrees Celsius and it is necessary for patent document 5 to use high processing temperature of 130-374 degrees Celsius.

This invention is provided to resolve the above-discussed problems. An object of the invention is to provide a method of treating biomass material that can achieve volume reduction or carbonization of biomass material, such as a food scraps, livestock excreta, agricultural waste products, marine waste products and forest waste products, at extremely low cost. Moreover, another object of the invention is to provide a method of utilizing the heat generated by the method of treating the biomass material.

Problem Resolution Means

In the process of researching methods for effectively reaction treatment of the organic waste that allows composting and reusing the organic waste or treating the organic waste by reducing the volume of the organic waste, the inventors of this application discovered that the composting of the organic waste can be realized by accelerating the biochemical reaction by microbial degradation when oxygen is effectively supplied to the organic waste, even when the organic waste is in the quagmire state with a high water content ratio. Further, the inventors discovered that the temperature of the organic waste surprisingly increases to 100 degrees Celsius and further to 200 degrees Celsius, which exceeded the temperature (around approximately 70 degrees Celsius) at which the self-heating by the microbial degradation ends (see the inventors' Japanese application No. 2008-99985 (corresponding to WO2009/125670A1)). After further consideration, the inventors invented this inventions by discovering that a similar temperature increase by itself occurs when the biomass materials with a low water content ratio is placed under a specific condition in the early stages, and that then, the volume reduction or carbonization of the he biomass materials can be achieved without heating up in the conventional way. Further, the inventors discovered that a similar temperature increase occurs when the organic waste with a low water content ratio is placed under a specific atmosphere. These discoveries were obtained based on the knowledge of the inventors, and the inventions relating to the below first to third aspects are proposed.

That is, the method of treating biomass material according to the invention to solve the above-discussed problems is to achieve volume reduction or carbonization of one type or more of biomass material which is selected among food scraps, livestock excreta, agricultural waste products, marine waste products and forest waste products in a pressurizable and heatable container. The method comprises: placing the biomass material in the container; setting an initial condition of the container after placing the biomass material, the initial condition including all of (a) an atmosphere in the container having oxygen, (b) a temperature range in the container being equal to or greater than 55 degree Celsius and equal to or less than 80 degree Celsius, (c) a pressure range in the container being over atmospheric pressure and equal to or less than 15 atmospheric pressure and (d) carbon monoxide concentration being equal to or greater than 100 ppm; increasing temperature of the biomass material over 80 degree Celsius under the initial condition; setting a continuation condition after initiating increase in the temperature of the biomass to over 80 degree Celsius under the initial condition, the continuation condition including all of: (i) the atmosphere in the container having oxygen; (ii) the pressure range in the container being over atmospheric pressure and equal to or less than 15 atmospheric pressure; and (iii) a carbon monoxide concentration in the container being equal to or greater than 100 ppm, and maintaining the continuation condition, in order to spontaneously increase temperature of the biomass material over at least 150 degree Celsius, and achieve volume reduction or carbonization of the biomass material.

According to this invention, the temperature of the biomass material is spontaneously increased to high temperature and volume reduction or carbonization of the biomass material is achieved by setting the specific condition in the container after placing the biomass material in the container, by increasing temperature of the biomass material under the specific condition and by maintaining the specific condition in the container after initiating the increase in the temperature of the biomass material. Therefore, volume reduction or carbonization of biomass material can be achieved at extremely low cost without heating the biomass material at high temperature in the conventional way.

In the method of treating biomass material according to the invention, the biomass material includes organic waste, temperature of which increases to at least 55 degree Celsius based on a reaction due to organic degradation by microbe in the organic waste by contacting to oxygen.

According to this invention, the biomass material includes organic waste, temperature of which increases at least to 55 degree Celsius based on a reaction due to organic degradation by microbe in the organic waste by contacting to oxygen. Therefore, volume reduction or carbonization of such biomass material is achieved after composting. As a result, waste products volume of which is reduced and which is carbonized can be returned to the natural world again by landfilling or the like.

In the method of treating the biomass material according to the invention, plastic material that has glass-transition temperature, which is equal to or less than 200 degree Celsius, is placed in the container with the biomass material.

According to this invention, plastic material that has glass-transition temperature, which is equal to or less than 200 degree Celsius, is placed in the container with the biomass material. Therefore, volume reduction or carbonization of the plastic material is achieved with biomass material the temperature of which is increased over at least 150 degree Celsius.

In the method of treating the biomass material according to the invention, the container comprises a drain valve, a heating device, and a pressure device, and the drain valve drains water on the bottom of the container regularly or irregularly along with increasing the temperature of the biomass material.

According to this invention, water on the bottom of the container regularly or irregularly can be drained along with increasing the temperature of the biomass material. Therefore, the efficiency of volume reduction or carbonization of the plastic material can be improved.

In the method of treating the biomass material according to the invention, carbon monoxide is supplied to the biomass material from the biomass material as a source of generation and supply and/or from a tank of carbon monoxide as a source of supply.

According to this invention, the carbon monoxide concentration in the container is maintained in the predetermined range by supplying carbon monoxide from the biomass material itself and/or the tank of carbon monoxide. Therefore, the efficiency of the treating of the biomass material can be improved.

A method of utilizing heat energy according to the invention to solve the above-discussed problems utilizes the heat generated by the method of treating the biomass material according to the above invention.

Advantageous Effect of the Invention

According to the method of treating biomass material of the invention, the temperature of the biomass material is spontaneously increased to high temperature and volume reduction or carbonization of the biomass material is achieved by setting the specific condition in the container after placing the biomass material in the container, by increasing temperature of the biomass material under the specific condition, and by maintaining the specific condition in the container after initiating the increase in the temperature of the biomass material. Therefore, volume reduction or carbonization of biomass material can be achieved at extremely low cost without heating the biomass material at high temperature in the conventional way.

According to method of utilizing heat energy of the invention, the heat generated by the method of treating the biomass material is utilized as a heat source. Therefore, the heat energy can be effectively used. In particular, by utilizing the heat energy as an energy source for livestock raising business and the like, the business cost can be saved, thereby increasing competition.

BRIEF DESCRIPTIONS OF THE DRAWINGS

Figure 9:
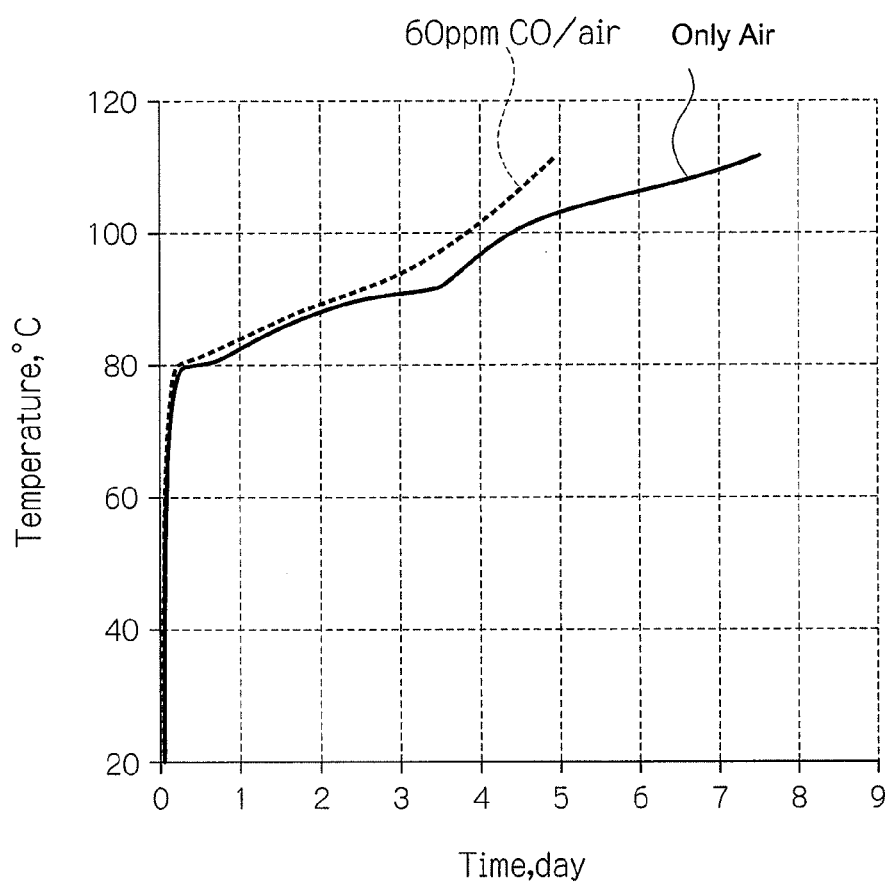
FIG. 9 is a graph indicating temporal changes in temperature of a test sample at 1 Mpa in Experiment 6.

FIG. 10 is a graph indicating one of examples of changes in temperature in an exothermic reaction using the biomass material (feces of a milk cow) under an initial environmental condition including the atmosphere in a container being air (oxygen), temperature in the container being 50 degree Celsius, and pressure in the container being 1 MPa, and one of examples of changes in temperature in the exothermic reaction using the test sample of Experiment 6 (kitchen waste) under an initial environmental condition including the atmosphere in a container being air (oxygen), temperature in the container being 40 degree Celsius and pressure in the container being 1 MPa, with the result of FIG. 9.

BEST MODE TO IMPLEMENT THE INVENTION

The methods of treating biomass material and utilizing heat energy according to the invention will be explained in detail based on embodiments below using figures. The below embodiments are preferable examples of the invention, and the construction of the invention is not limited to the embodiments.

[Method of Treating Biomass Material]

The method of treating biomass material according to the invention to achieve volume reduction or carbonization of one type or more of the biomass material which is selected among food scraps, livestock excreta, agricultural waste products, marine waste products and forest waste products in a pressurizable and heatable container. In the method, first of all, the biomass material is placed in the container, next an initial condition of the container is set, the initial condition including all of (a) an atmosphere in the container having oxygen, (b) a temperature range in the container being equal to or greater than 55 degree Celsius and equal to or less than 80 degree Celsius, (c) a pressure range in the container being over atmospheric pressure and equal to or less than 15 atmospheric pressure and (d) carbon monoxide concentration being equal to or greater than 100 ppm next, and next temperature of the biomass material is increased over 80 degree Celsius under the initial condition. Secondary, a continuation condition is set after initiating increase in the temperature of the biomass under the initial condition to over 80 degree Celsius, the continuation condition including all (i) the atmosphere in the container having oxygen, (ii) the pressure range in the container being over atmospheric pressure and equal to or less than 15 atmospheric pressure and (iii) a carbon monoxide concentration in the container being equal to or greater than 100 ppm, and next the continuation condition is maintained, in order to spontaneously increase temperature of the biomass material over at least 150 degree Celsius, and achieve volume reduction or carbonization of the biomass material.

The method of treating the biomass material of the invention will be explained in detail. The following symbol "%" indicates a percent by weight unless otherwise mentioned.

(Biomass Material)

Biomass material includes one type or more waste products which is selected among food scraps, livestock excreta, agricultural waste products, marine waste products and forest waste products. Specifically, the biomass material is food scraps (food residuum) such as kitchen waste, excreta (enteruria) of livestock such as cows, pigs and houses, agricultural waste products such as surplus products, reject products and processing by-products, marine waste products such as excess marine harvests and process waste of marine products, and forest waste products such as wood waste, woodchips and process waste of forest products. The biomass material used for the method of treating the biomass material may include only one type of the above waste products or a plurality of types of the above mixed waste products.

Such biomass material used for the method of treating biomass material may be in a quagmire state or a dry state independently of a water content ratio of the biomass material, and may have been composed or may not have been composed. For example, the method of treating biomass material uses the biomass material inside which the oxygen is difficult to penetrate with a high water content ratio when the biomass material is left out and in which the biochemical reaction by the microbe is difficult to occur; biomass material in which air permeability at a part or all of the inside of the biomass material is not sufficient; dry-type biomass material which has carbon as its substrate with a low water content ratio (including 0%), such as feces of a milk cow, wood chips and raw rice; and biomass material which has already been composed.

Of these types of biomass material, the composed biomass material is composed by increasing temperature of the biomass material to at least 55 degree Celsius based on a reaction due to organic degradation by microbe in the biomass material by contacting to oxygen. Because volume reduction or carbonization of this type of the biomass material is achieved by the method of treating the biomass material after composting, this type of the biomass material can be returned to the natural world again by landfill or the like.

When the water content ratio of the biomass material is equal to or greater than 80% such as excreta (enteruria) of livestock and agricultural waste products, or the local water content ratio of the biomass material although the water content ratio of the entire biomass material, is equal to or greater than 80%, these biomass material is in the quagmire state. In this case, the method of treating the biomass material uses the biomass material in the quagmire state without any problem. However, because the oxygen is difficult to enter inside the biomass material in the quagmire state from the surface thereof as discussed later, the biochemical reaction by microbe is difficult to accelerate. Therefore, a forcedly pressure means is used for the method of treating the biomass material as means to supply the oxygen inside the biomass material. For example, the forcedly pressure means indicates means which increases pressure in a sealed container by supplying air, oxygen or the like from a tank. Further, when the water content ratio of the entire organic waste or the local water content ratio of the biomass material waste is less than 80%, the phenomenon that the oxygen is difficult to enter inside the biomass material measurably weakens, and therefore, the need to forcefully supply the oxygen inside the biomass material decreases. As a result, spontaneous pressure means can be used to supply the oxygen inside the biomass material. Obviously, forcedly pressure means can be used when the water content ratio of the entire organic waste or the local water content ratio of the organic waste is less than 80%. For example, the spontaneous pressure means indicates means which spontaneously increases pressure in a sealed container when heating in the container.

When the biomass material is food scraps such as kitchen waste, the water content ratio of the entire organic waste is equal to or greater than 40% or locally equal to or greater than 40% although the water content ratio of the entire organic waste is low. When the biomass material includes a significant amount of fiber, such as the above-discussed livestock excreta (enteruria), the agricultural waste, and the like, and the entire or local water content ratio of this biomass material is equal to or greater than 80%, and this biomass material becomes in the quagmire state. However, the food scraps and the like, which do not include a large amount of fiber, becomes in the quagmire state under 80%, and normally tend to becomes in the quagmire state at 40% or greater. Therefore, the oxygen is supplied inside to such food scraps by forcedly pressure means or spontaneous pressure means. The term "entirely" with respect to the water content ratio indicates a ratio at which the moisture is contained in the biomass material equally or relatively equally. On the other hand, the term "locally" with respect to the water content ratio indicates a case where the water content ratio of the entire biomass material is equal to or less than 80% (for livestock excreta and the like) or less than 40% (for food waste such as food scraps), but the biomass material locally includes parts in the quagmire state with the water content ratio being equal to or greater than 80% or 40%, respectively.

Measurement of the water content ratio of the entire biomass material can be evaluated by obtaining a predetermined amount of a sample of the biomass material and by performing a mass measurement of the sample before and after drying the sample. In contrast, the local water content ratio of the biomass material can be evaluated by obtaining a small amount of a local sample of the biomass material and by performing a mass measurement of the sample before and after drying the sample.

The other waste products are used by mixing in such biomass material in the method of treating the biomass material. The other waste products include plastic material (BA-RA-N or Hi-To-Tsu-Ba (which are a small sheet of decorative things made of plastic), bottle cap, straw, rubber band, packing material and the like), paper products, wood product and the like, which are easily disposed with the household food scraps. Further, heat resistance of the plastic material is different in type. In the method of treating the biomass material of the present invention, the plastic material which has glass-transition temperature, which is equal to or less than 200 degree Celsius, is used. For example, as plastic material which has glass-transition temperature being equal to or less than 150 degree Celsius, polyethylene naphthalate (glass transition temperature: 120 degree Celsius), polybutylene terephthalate (75 degree Celsius), polyethylene terephthalate (75 degree Celsius), polyphenylene sulfide (90 degree Celsius), polyether ether ketone (143 degree Celsius) and polycarbonate (145 degree Celsius) are used with the biomass material for the method of treating the biomass material of the present invention. By mixing these waste products in the biomass material, volume reduction or carbonization of these waste products with the biomass material temperature of which is increased to temperature over at least 150 degree Celsius can be achieved.

(Treatment Container)

Figure 1:
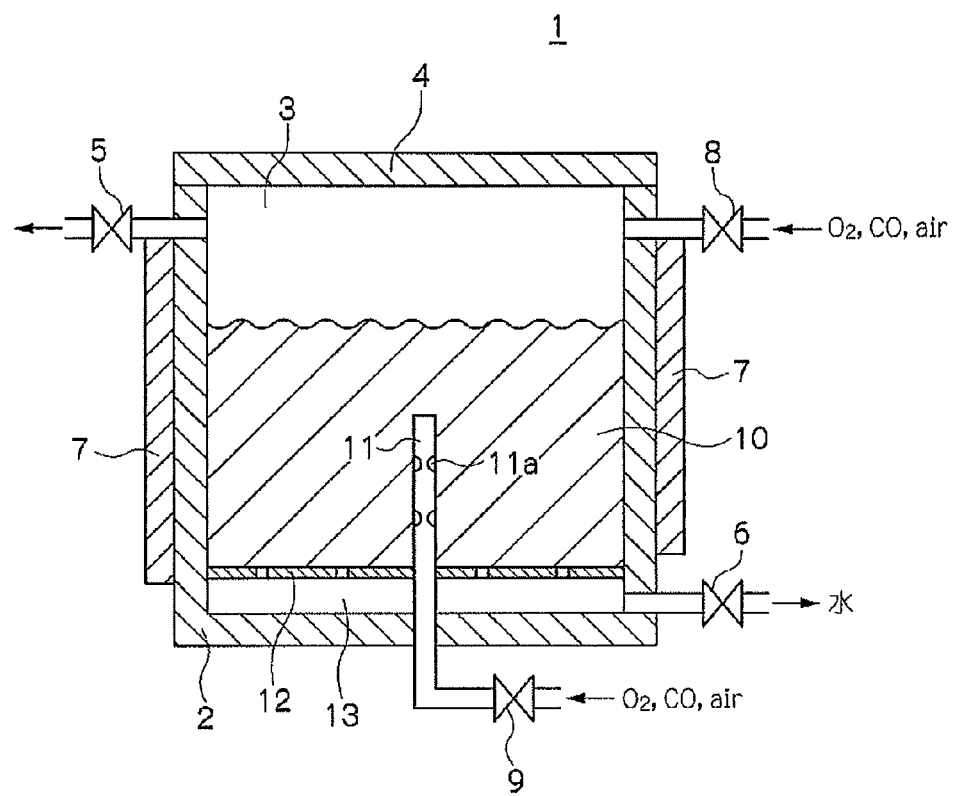
FIG. 1 is schematic configuration diagrams illustrating one example of a container used by a method of treating biomass material of the present invention.

FIG. 1 is schematic configuration diagrams illustrating one example of a container used by a method of treating biomass material of the present invention. As shown in FIG. 1, container 1 is sealed by main body 2 and cover 4, and has the abilities to pressure and heat. Biomass material 10 is placed in container 1 from opening portion 3 for material by opening cover 4. Cover 4 may be a top portion disposed on a top of container 1 or a door disposed at a side of container 1, although form and a location of cover 4 is not particularly limited. The material of container 1 is also not particularly limited. The material of container 1 may have an anti-corrosion characteristics against the biomass material and a material with heat durability. For example, the material may be stainless steel.

In the present invention, temperature of biomass material 10 is increased by setting the specific condition in container 1, and the temperature of biomass material 10 in container 1 is further increased to high temperature spontaneously by maintaining the specific condition after initiating increase in the temperature in order to achieve volume reduction or carbonization of the biomass material Heating device 7 disposed in main body 2 heats container 1. The heating of container 1 is performed by an electric heater and the like in heating device 7 although the heating means is not particularly limited. Further, heating device 7 is covered with heat insulating material. Container 1 has a thermometer such as a thermoelectric couple has heat-resistant coating. The thermometer is disposed in container 1 to accurately measure temperature of biomass material 10 in container 1. For this reason, the thermometer is disposed at a portion at which biomass material is placed preferably.

A pressure device (not shown) pressurizes inside of container 1. Specifically, one type of gas or more among oxygen, air and carbon monoxide is supplied into container 1 from gas valve 8 disposed in container 1 to pressurize inside of container 1. These gases are used for combustion of biomass material 10 in container 1. The pressure device can select one type of gas or more among them, and supply the selected one type of gas or more into container 1, by detecting gas concentration inside container 1 by a sensor, or the like. Because concentration of carbon monoxide is as low as about 100 ppm, compressed oxygen or compressed air is generally used by pressure means such as a press pump, a compressor or the like, in order to pressurize in container 1 to the predetermined value. Each of gases is supplied into container 1 from each tank, respectively or is supplied into container 1 after mixing in the other gas. A pressure indicator, which is able to measure pressure inside container 1 at about a range equal to or greater than atmosphere pressure and equal to less than 20 atmosphere pressure, is disposed in container 1. As a pressure indicator disposed in container 1, one of commercially-supplied pressure indicators is used although the pressure indicator is not particularly limited.

Gas control valve 9 may be disposed in container 1 in order to directly introduce one type of gas or more among oxygen, air and carbon monoxide inside biomass material 10. Gas control valve 9 is connected to filling pipe 11 having hole 11*a* at lower lever of container 1 than a level where biomass material is generally filled in container 1. The presses is performed by pressurizing the inside of container 1 in the present invention, and therefore, as shown FIG. 1, the gas can be introduced inside biomass material 10 and then, an exothermic reaction of the biomass material 10 can be generated, even when gas valve 8 disposed at the top of main body 2. Further, by disposing gas control valve 9 and filling pipe 11 in container 1, the gas(es) can be directly introduced inside biomass material 10, and the exothermic reaction of the biomass material 10 can be more effectively performed. Specifically, the exothermic reaction of the biomass material 10 can be more effectively performed by supplying oxygen into container 1 and introducing the oxygen inside biomass material 10, preferably.

Preferably, a carbon monoxide concentration detector may be disposed in container 1. The carbon monoxide concentration detector measures the concentrate of carbon monoxide in container 1, and is useful to monitor a progress status of an exothermic reaction of biomass material 10 or the like. One of commercially-supplied carbon monoxide concentration detector is used, and a position of carbon monoxide concentration detector in container 1 is not limited.

Water drained from biomass material 10 stands at bottom portion 13 of container 1 though bottom plate 12 (a divider having a hole for the water to pass therethough). Drain valve 6 disposed in bottom portion 13 is disposed to drain such water to the outside regularly or irregularly. The control of drain valve 6 may be manually or automatically performed. The term "regulary" means that, for example, drain valve 6 is periodically operated. The term "irregularly" means that, for example, drain valve 6 is operated when pressure inside container 1 becomes the predetermined pressure, when temperature inside container 1 becomes the predetermined temperature or the like, although drain valve 6 is not periodically operated.

Leak valve 5 may be disposed in container 1 to control the pressure inside container 1. Leak valve 5 is used when the process ends, and may be used when the pressure inside container 1 becomes the predetermined pressure. Although leak valve 5, gas valve 8, gas control valve 9 and the like are disposed in main body 2 at FIG. 1, for example, these may be disposed at cover 4. The positions of leak valve 5, gas valve 8, gas control valve 9 to dispose in container 1 are not limited.

Because the pressure to be controlled is not particularly high, it is not necessary to use an expensive pressure container. Therefore, the container at low cost is used for the method of treating the biomass material of the present invention.

(Initial Condition)

In the method of treating biomass material, first of all, after placing the biomass material in a container, an initial condition of the container is set, and the initial condition includes all of (a) atmosphere in container 1 having oxygen, (b) temperature in container 1 which is equal to or greater than 55 degree Celsius and equal to or less than 80 degree Celsius, (c) pressure in container 1 which is over atmospheric pressure and equal to or less than 15 atmospheric pressure and (d) carbon monoxide concentration in container 1 which is equal to or greater than 100 ppm. By setting such an initial condition of container 1 as a specific condition, temperature of biomass material 10 placed in container 1 can be increased to over 80 degree Celsius.

(a) Necessary atmosphere gas in container 1 includes oxygen. The oxygen contributes an exothermic reaction of biomass material 10 by reacting oxygen with carbon of biomass material 10. When introducing the oxygen inside biomass material 10, oxygen can be entered inside biomass material 10 by pressurizing the inside of container 1 (in the temperature range over atmosphere pressure and equal to or less than 15 atmosphere pressure). Further, the oxygen can be more effectively and directly entered inside biomass material 10 from gas control valve 9 connected to filling pipe 11 indicated in FIG. 1. The introduced gas may be only oxygen gas, or the oxygen gas mixed in other carrier gas. Generally, standard air including about 20% of the oxygen is used.

(b) The temperature in container 1 is set in a range equal to or greater than 55 degree Celsius and equal to or less than 80 degree Celsius.

By adjusting the temperature in container 1 in this range, an exothermic reaction of biomass material 10 can be generated, and the temperature of biomass material 10 can be increased to over 80 degree Celsius. The temperature in container 1 is adjusted by heating device 7 so as to settle the temperature in the above range. As the settled temperature is within the range of the initial condition, heating device 7 maintains the settled temperature in container 1 or stop to heat in container 1 by switching off after increasing the temperature of biomass material 10 to over 80 degree Celsius, and transferring to a continuation condition as discussed below.

(c) The pressure in container 1 is set in a range over atmospheric pressure and equal to or less than 15 atmospheric pressure. By adjusting the pressure in container 1 in this range, the above oxygen can be easily supplied inside biomass material 10. The pressure in container 1 can be added by introducing gas from gas valve 8 into sealed container 1. The pressure in container 1 is preferably equal to or greater than 2 atmospheric pressure and equal to or greater than 10 atmospheric pressure from a viewpoint of oxygen supply inside biomass material 10 and more preferably equal to or greater than 2 atmospheric pressure and equal to or greater than 5 atmospheric pressure from a viewpoint of an inexpensive container.

The pressure in container 1 may be constantly adjusted at constant pressure, or may be changed if the pressure is within the above range. By operating leak valve 5 and gas valve 8, the pressure in container 1 can be constantly adjusted at constant pressure. The pressure can be adjusted by operating leak valve 5 so that the pressure is not over the predetermined upper limit when the pressure is changed. Additionally, drain valve 6 does not need to open because of lack of need for draining water from container 1.

(d) Carbon monoxide concentration in container 1 is equal to or greater than 100 ppm. Carbon monoxide is supplied from biomass material 10 which is a source of generation and supply, and/or a tank of carbon monoxide which is a source of supply. Carbon monoxide is generated from biomass material 10 when biomass material 10 defectively reacts with oxygen. The carbon monoxide concentration in container 1 may be equal to or greater than 100 ppm by generating carbon monoxide from biomass material 10, depending on types of biomass material 10. When the carbon monoxide concentration is not equal to or greater than 100 ppm by generating carbon monoxide from biomass material 10, the carbon monoxide concentration in container 1 can be equal to or greater than 100 ppm by additionally supplying predetermined amount of carbon monoxide into container 1 from gas valve 8. Further, when there is little carbon monoxide which is generated from biomass material 10, the carbon monoxide concentration in biomass material 10 can be equal to or greater than 100 ppm by supplying predetermined amount of carbon monoxide into container 1 from gas valve 8.

By adjusting the carbon monoxide concentration in container 1 to equal to or greater than 100 ppm, an exothermic reaction of biomass material 10 with oxygen can be generated. When the carbon monoxide concentration is less than 100 ppm, the exothermic reaction of biomass material 10 is not sufficiently generated, and also the temperature of biomass material 10 is seldom increased, compared with the carbon monoxide concentration equal to or greater than 100 ppm. Therefore, there is a possibility that volume reduction or carbonization of biomass material 10 is decelerated. Although the necessary and sufficient carbon monoxide concentration of container 1 is in a range equal to or greater than 100 ppm and equal to or less than 500 ppm, the exothermic reaction of biomass material 10 is not blocked even when the carbon monoxide concentration in container 1 is greater than the range (see after-mentioned FIG. 7).

As discussed above, by setting the specific initial condition of the container, temperature of biomass material can be increased to over 80 degree Celsius. For example, when food wastes such as food scraps is placed in a container, and the initial condition of the container indicated by the above (a)-(d) is set, temperature of the food wastes is increased to over 80 degree Celsius by reacting with the carbon monoxide having the concentration equal to or greater than 100 ppm and oxygen, and by generating an exothermic reaction of the food wastes. For example, when wood chips which is dried biomass material is placed in the container, and the initial condition of the container indicated by the above (a)-(d) is set, temperature of the wood chips is increased to over 80 degree Celsius by reacting with the carbon monoxide having the concentration equal to or greater than 100 ppm and oxygen, and by generating an exothermic reaction of the food wastes.

(Continuation Condition)

In the method of treating biomass material, secondary, after initiating increase in the temperature to over 80 degree Celsius under the above initial condition, by setting a continuation condition that includes all of (i) atmosphere in a container having oxygen, (ii) a pressure range in the container being over atmospheric pressure and equal to or greater than 15 atmospheric pressure and (iii) carbon monoxide concentration in the container being equal to or greater than 100 ppm, temperature of the biomass material is spontaneously increased to the temperature over at least 150 degree Celsius in order to achieve volume reduction or carbonization of the biomass material. By setting such an continuation condition as a specific condition, an exothermic reaction generated under the initial condition is maintained. Therefore, the temperature of the biomass material placed in the container can be increased to high temperature over at least 150 degree Celsius. Additionally, the continuation condition is the same as the initial condition except for a temperature condition.

(i) In the continuation condition, necessary atmosphere gas in container 1 includes oxygen. In the same way of the above initial condition, the oxygen contributes an exothermic reaction of biomass material 10 by reacting oxygen with carbon of biomass material 10. When introducing oxygen inside biomass material 10, as shown in FIG. 1, oxygen can be entered inside biomass material 10 by pressurizing the inside of container 1 (in the temperature range over atmosphere pressure and equal to or less than 15 atmosphere pressure). Further, the oxygen can be more effectively and directly entered inside biomass material 10 from gas control valve 9 connected to filling pipe 11 indicated in FIG. 1. The introduced gas may be only oxygen gas, or the oxygen gas mixed in other carrier gas. Generally, standard air including about 20% of the oxygen is used.

(ii) Also, in the same way of the above initial condition, the pressure in container 1 is set in a range over atmospheric pressure and equal to or less than 15 atmospheric pressure. By adjusting the pressure in container 1 in this range, the above oxygen can be easily supplied inside biomass material 10. The pressure in container 1 can be added by introducing gas from gas valve 8 into sealed container 1. The pressure in container is preferably equal to or greater than 2 atmospheric pressure (0.2 Mpa) and equal to or greater than 10 atmospheric pressure (1 Mpa) from a viewpoint of oxygen supply inside biomass material 10, and more preferably equal to or greater than 2 atmospheric pressure (0.2 Mpa) and equal to or greater than 5 atmospheric pressure (0.5 Mpa) from a viewpoint of an inexpensive container.

Under the continuation condition, as water included in biomass material 10 stands at bottom portion 13, drain valve 6 is opened regularly or irregularly. Then, although the pressure in container 1 is released to air, by immediately closing drain valve 6, the water included in biomass material 10 is vaporized into steam, and then, inner pressure of container 1 is increased. As a result, the pressure in container 1 easily recovers atmosphere over the predetermined atmospheric pressure. Additionally, the inner pressure of container 1 may be adjusted by supplying gas into container 1 from gas valve 8 after closing drain valve 6. Such regular or irregular discharge of the water has advantage to accelerate drying of biomass material 10. As the continuation condition of the present invention has a process which opens such drain valve 6, and the pressure in container 1 temporarily becomes out of a range equal to or greater than an atmospheric pressure and equal to or less than 15 or carbon monoxide concentration in container 1 temporarily becomes less than 100 ppm by diluting the carbon monoxide concentration. Therefore, "the continuation condition" includes these cases. the continuation condition of the present invention preferably includes the drain process with the above initial condition including all of (i)-(iii).

The pressure in container 1 may be constantly adjusted at constant pressure, or may be changed if the pressure is within the above range. By operating leak valve 5 and gas valve 8, the pressure in container 1 can be constantly adjusted at constant pressure. The pressure can be adjusted by operating leak valve 5 so that the pressure is not over the predetermined upper limit when the pressure is changed.

(iii) Carbon monoxide concentration in container 1 is equal to or greater than 100 ppm. Carbon monoxide is supplied from biomass material 10 which is a source of generation and supply, and/or a tank of carbon monoxide which is the source of supply. Carbon monoxide is generated from biomass material 10 when biomass material 10 defectively reacts with oxygen. The carbon monoxide concentration in container 1 may be equal to or greater than 100 ppm by generating carbon monoxide from biomass material 10, depending on types of biomass material 10. When the carbon monoxide concentration is not equal to or greater than 100 ppm by generating carbon monoxide from biomass material 10, the carbon monoxide concentration in container 1 can be equal to or greater than 100 ppm by additionally supplying predetermined amount of carbon monoxide into container 1 from gas valve 8. Further, when there is little carbon monoxide which is generated from biomass material 10, the carbon monoxide concentration in biomass material 10 can be equal to or greater than 100 ppm by supplying predetermined amount of carbon monoxide into container 1 from gas valve 8.

If the carbon monoxide concentration is less than 100 ppm, an exothermic reaction of biomass material 10 is not sufficiently generated, and also the temperature of biomass material 10 is seldom increased, compared with the carbon monoxide concentration equal to or greater than 100 ppm. Therefore, there is a possibility that volume reduction or carbonization of biomass material 10 have decelerated. By adjusting the carbon monoxide concentration in container 1 to equal to or greater than 100 ppm, an exothermic reaction of biomass material 10 with oxygen can be generated. Although the necessary and sufficient carbon monoxide concentration of container 1 is in a range equal to or greater than 100 ppm and equal to or less than 500 ppm, the exothermic reaction of biomass material 10 is not blocked when the monoxide concentration of container 1 is greater than the range (see aftermentioned FIG. 7).

In the continuation condition, the temperature in container 1 is not added as in the case of the initial condition. This is because the exothermic reaction of biomass material 10 by itself continues by maintaining the atmosphere having the conditions of (i)-(iii) in container 1. The temperature in container 1 under the continuation condition may be maintained by adding the same temperature under the initial condition, and heating device 7 may be turned off.

As discussed above, by setting the specific initial condition of container 1, temperature of biomass material 10 can be increased to temperature over at least 150 degree Celsius and equal to or greater than 200 degree Celsius. As a result, volume reduction or carbonization of biomass material 10 can achieved. Specifically, under the continuation condition it is unnecessary to heat the biomass material at high temperature. Therefore, a lot of electrical energy is not needed, and then, it is expected to use the method of the present invention as one of methods and devices to achieve CO2-reduction goal.

The Even though, details of an exothermic reaction are not sufficiently ascertained, it is presumed that the exothermic reaction is at least one of an exothermic reaction in which the biomass material reacts with oxygen to generate carbon dioxide, an exothermic reaction in which the biomass material reacts with oxygen to generate carbon monoxide, and an exothermic reaction in which the carbon monoxide reacts with oxygen to generate carbon dioxide.

As discussed above, in the method of treating the biomass material performed under the initial condition and the continuation condition according to the present invention, it takes approximately equal to or more than 3 days and equal to or less than 14 days for increasing the temperature of the biomass material to over at least 150 degree Celsius, although depending on states including types of the biomass material which is a treated target, a water content ratio of the biomass material and the like. Therefore, a plurality of treatment containers and a plurality of treatment devices are preferably prepared and used based on an amount of the biomass material.

[Method of Utilizing Heat Energy]

A method of utilizing heat energy according to the present invention is a method for using, as a heat source, the heat generated by utilizing a principal of heat generation in the method of treating biomass material.

As a detailed method for utilizing heat energy, a method that exchanges the heat of water vapor generated after treating the biomass material in the container, as a heat source, may be used. In this case, a heat exchanger may be used. The heat exchanger may be provided directly or via a pipe to the container such that a high temperature vapor is introduced from the container and provided externally as a high temperature-side heat source. Further, a method that uses the heat of water vapor generated after treating the biomass material in the container, as a heat source for refrigerant, may be used.

For example, it takes approximately equal to or more than 3 days and equal to or less than 14 days for the temperature of the biomass material to raise its temperature to over at least 150 degree Celsius. Therefore, the heat generated by chemical reaction can be used as a contiguous heat source by a plurality of treatment devices indicated in FIG. 1, and by running the plurality of treatment devices at the different timing of each of the devices when the biomass material is placed.

For such utilization, it is preferable that the vapor that was cooled down by a heat exchanger is circulated into the reaction treatment container again to recycle the water. By doing so, carbonization of the biomass material can be suppressed, and the biomass material can be continuously used for a relatively long time as a heat resource.

EXAMPLES

Next, the method of treating the biomass material according to this invention is explained in detail by referring to specific experiments.

Experiment 1

As a sample for an exothermic reaction test, feces of a milk cow obtained from a farm of the Agricultural Dept. of Utsunomiya University was used in the exothermic reaction test after adjusting its water content ratio at approximately 50-60% w.b. and after leaving the biomass material out at 30 degree Celsius for approximately 15 hours. For a test device, a container having a structural form similar to the one shown in FIG. 1 is used. 220 g of a sample (water content ratio: 51.6 w.b. %) is placed in a 1-litter reactor. Air is supplied into the container from gas valve 8 to maintain pressure in the container at 1 MPa. Carbon monoxide concentration of the container is measured by a gas detector (GASTEC, Japan). At 1 MPa the gas is measured after extracting the gas by an extraction bag of 1 litter, and at atmospheric pressure the gas is directly measured in the container.

Figure 2:
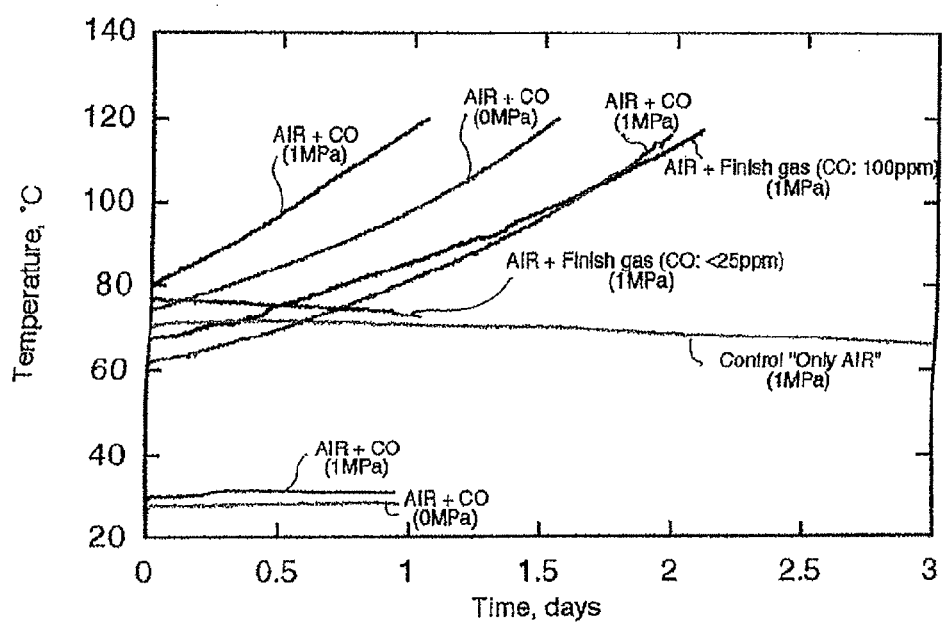
FIG. 2 is a graph indicating changes in temperature in the exothermic reaction when air and carbon monoxide are only supplied to the container.

FIG. 2 is a graph showing results of changes in temperature in an exothermic reaction in a container filled with oxygen and carbon monoxide only. If the exothermic reaction generated by the method of treating the biomass material according to the present invention is originated by the gases mainly carbon monoxide, the temperature should increase by filling the container with only air and carbon monoxide. After filling the air and carbon monoxide in the container and forcedly heating in the container in a range equal to or greater than 62 degree Celsius and equal to or less than 80 degree Celsius, it was confirmed that the temperature in the exothermic reaction increased under 0.1 Mpa (atmospheric pressure) and 1 MPa with only the air and carbon monoxide. Specifically, the increased temperature under 1 MPa is speedier than that under 0.1 Mpa. The temperature in the container was not increased under the pressure of 1 MPa when filing the container with air only as a reference.

After conducting the exothermic reaction test by mixing the air and "gas after the slightly high pressure reaction using feces of a milk cow (labeled "Finish gas")," the temperature in the exothermic reaction increased when concentration of carbon monoxide was 100 ppm, but the temperature in the exothermic reaction decreased when the concentration of carbon monoxide was equal to or less than 25 ppm. After comparing the first increase in temperature in the exothermic reaction when method of treating the biomass which is initiated to perform from the range equal to or greater than 62 degree Celsius and equal to or less than approximately 70 degree Celsius, and the second increase in temperature in the exothermic reaction when the method of treating the biomass material is initiated to perform from the range equal to or greater than approximately 70 degree Celsius and equal to or less than approximately 80 degree Celsius, the first one was speedier than the second one.

In contrast, in the case of performing the reaction using the air and carbon monoxide from a room temperature, increase in temperature in the exothermic reaction was not observed under atmospheric pressure (0.1 MPa) and 1 MPa. Therefore, it was presumed that a certain amount of temperature in the container is required in order to initiate the reaction by air and carbon monoxide. From these, it was proven that an exothermic reaction is a gaseous chemical reaction, and that carbon monoxide involves with the exothermic reaction. In addition, it became apparent that minimum temperature and carbon monoxide concentration in a container are needed to initiate an exothermic reaction.

Experiment 2

Figure 3:
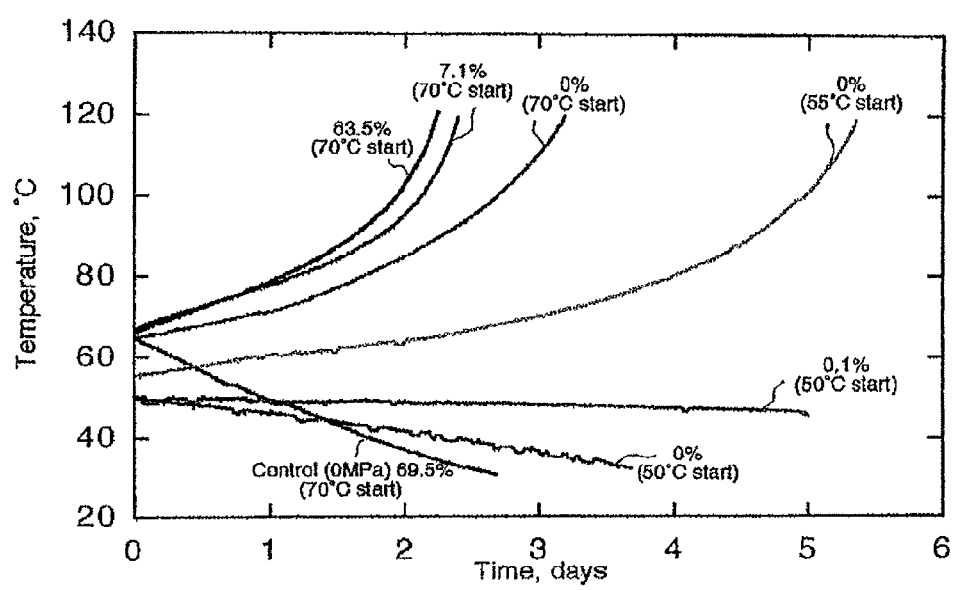
FIG. 3 is a graph indicating changes in temperature in the exothermic reaction using dried feces of a milk cow when pressurizing at 1 MPa in the container after heating the dried feces of the milk cow in the range equal to or more than 50 degree Celsius and equal to or less than 70 degree Celsius.

FIG. 3 is a graph showing changes in temperature in an exothermic reaction using dried feces of a milk cow when pressurizing at 1 MPa in a container after heating the dried feces of the milk cow in the range equal to or more than 50 degree Celsius and equal to or less than 70 degree Celsius. As a result of forcedly heating the dried feces of the milk cow in the range equal to or more than 50 degree Celsius and equal to or less than 70 degree Celsius, the temperature of the dried feces of the milk cow was increased even when the water content ratio is equal to or greater than 0% w.b. and equal to or less than 63.5% w.b. Therefore, it was confirmed that a water content ratio of biomass material does not involve with an exothermic reaction. On the other hand, in the case of a reference (water content ratio: 69.5% w.b. and initiated temperature: 70 degree Celsius) for which the exothermic reaction was initiated under atmospheric pressure, the temperature of the biomass material decreased. It is considered that carbon monoxide concentration needed for an exothermic reaction with increasing temperature of biomass material was not sufficiently supplied to the biomass material which is a generated source under atmospheric pressure. Therefore, it was presumed that pressure has an effect to cause the carbon monoxide to be easily generated from biomass material.

Further, the increase in temperature of the biomass material was confirmed also when the initial temperature in the container for the exothermic reaction test is set at 55 degree Celsius. However, the increase in temperature of the biomass material was not confirmed when the exothermic reaction test was initiated from 50 degree Celsius. Therefore, the exothermic reaction by the gas mainly of carbon monoxide is considered to initiate at least 55 degree Celsius or greater.

Experiment 3

Figure 4:
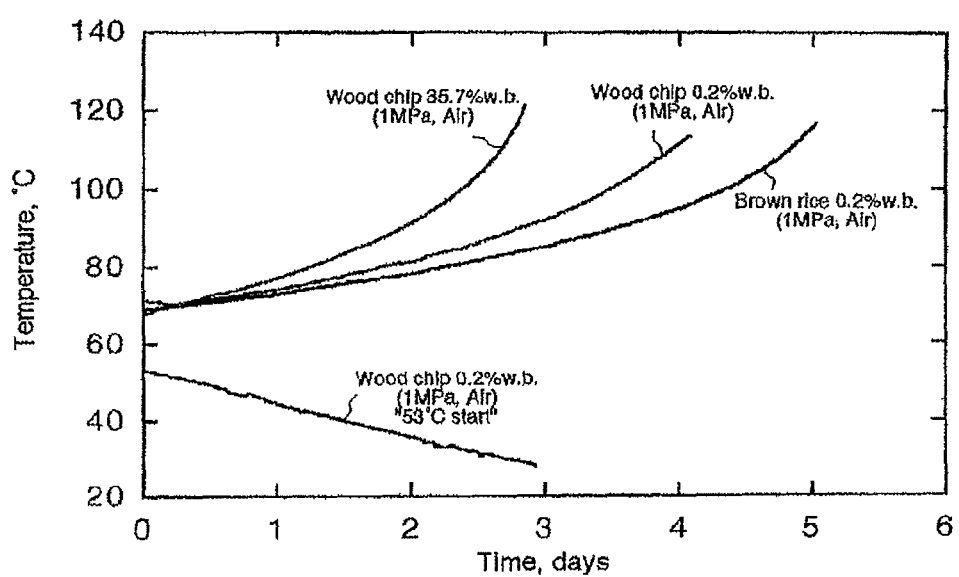
FIG. 4 is a graph showing changes in temperature in the exothermic reaction using dry-type biomass (wood chips, raw rice) excluding feces of a milk cow when pressurizing at 1 MPa in the container.

FIG. 4 is a graph showing changes in temperature in an exothermic reaction using dry-type biomass (wood chips, raw rice) excluding feces of the milk cow. When initial temperature was set at approximately 70 degree Celsius at 1 MPa in a container, the temperature of both of the wood chips and raw rice was increased. This means that the temperature can be increased when an organic matter (including C) that generates carbon monoxide exists. When the wood chips was used as the biomass material, and the initial temperature was set at 53 degree Celsius at 1 MPa in the container, the temperature of the biomass material was decreased. This supplements that the exothermic reaction is not easily generated at a temperature less than 55 degree Celsius, similar to the dried feces of the milk cow.

Experiment 4

Figure 5:
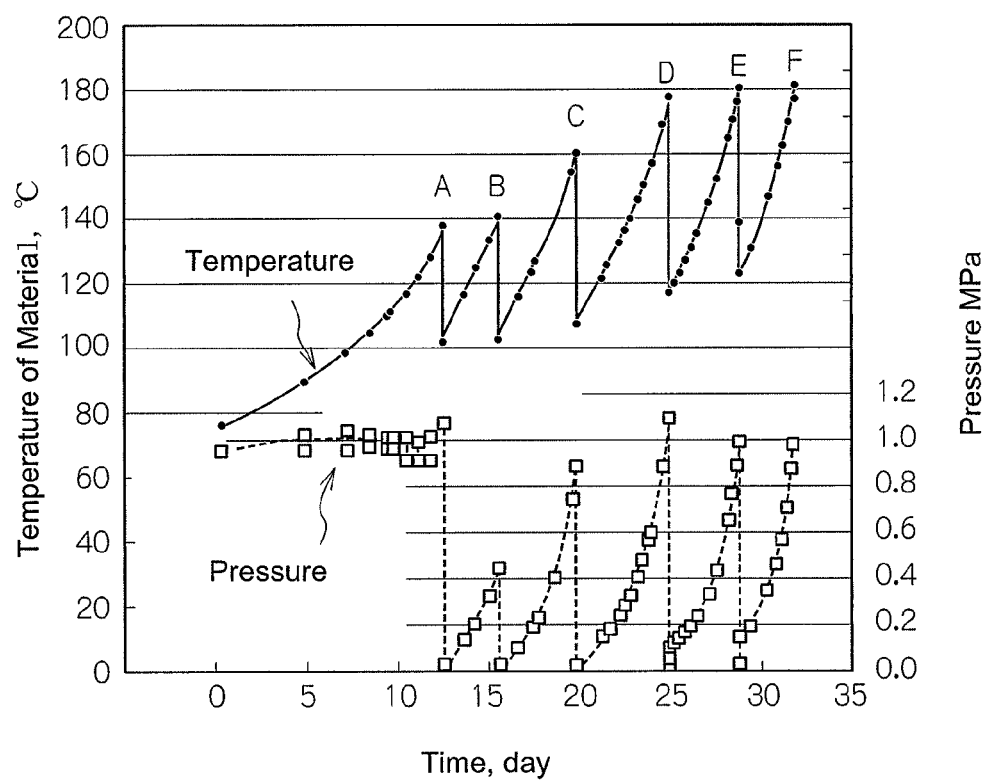
FIG. 5 is a graph indicating changes in temperature in the exothermic reaction using the biomass material mixed in plastic material and change in pressure in a container when regularly draining water in the exothermic reaction process.

In Experiment 4, household food scraps was used for the biomass material, and further, mixture having bottle caps (polypropylene) of PET bottles, tea bags, toothpicks, straws, BA-RA-Ns (used in a Sushi lunch box), plastic caps, rubber bands, packing materials (soy sauce plastic bottle and the like) was placed in a container with the household food scraps. Experiment 4 was initiated under an initial condition including air filled in the container, temperature in the container being at 75 degree Celsius, pressure in the container being at 1 MPa, and carbon monoxide concentration in the container being approximately 100 ppm. FIG. 5 is a graph indicating changes in temperature in an exothermic reaction using biomass material mixed in a plastic material and change in pressure in a container when regularly draining water in the exothermic reaction process. The temperature of the biomass material was increased, and the temperature of the biomass material exceeded 80 degree Celsius immediately. After that, although the heating in the container was stopped, the temperature of the biomass material continued to increase. When the temperature of the biomass material reached to 140 degree Celsius, the drain valve was opened to perform water drainage A. Temporarily, the temperature of the biomass material became approximately 100 degree Celsius, and the pressure in the container became atmospheric pressure. However, immediately the temperature of the biomass material was increased and the pressure in the container was increased after that. The pressure in the container was increased because the inner pressure of the container becomes high by vaporizing water contained in the biomass material. Additionally, the carbon monoxide concentration was always exceeded 100 ppm.

Figure 6A:
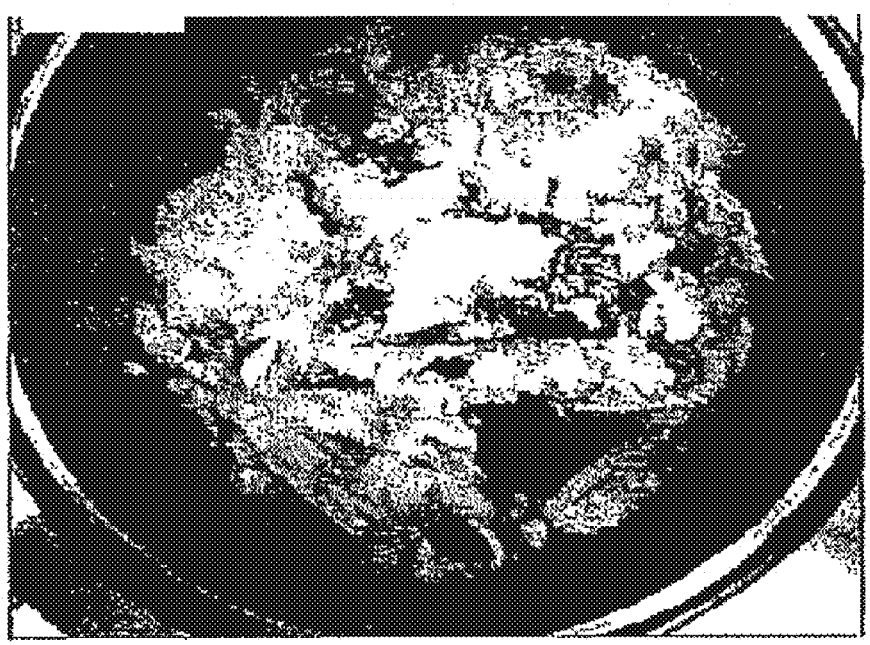
FIG. 6A is a photograph of a configuration of biomass material before an experiment.
Figure 6B:
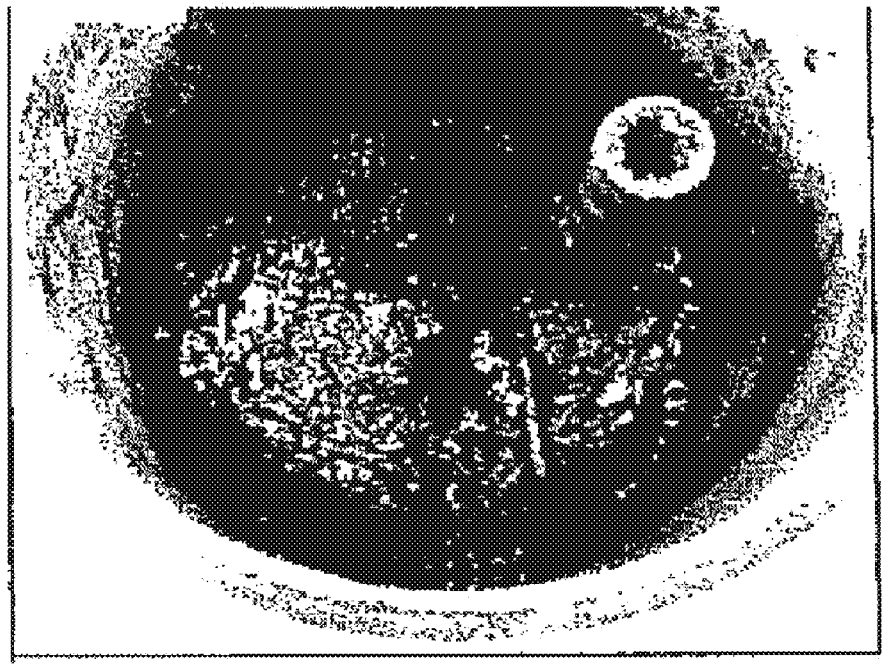
FIG. 6B is a photograph of a configuration of the biomass when the volume reduction and carbonization of the biomass material after an experiment.

After that, as shown in FIG. 5, each of water drainage B, C, D, E and F was performed. Although the temperature of the biomass material was temporarily decreased, and the pressure in the container became atmospheric pressure, similar to when performing water drainage A, immediately the temperature of the biomass material was increased and the pressure in the container was increased after that. The amount of water drainage, the amount of remained water in the container, and a ratio of the remained water was indicated in Table 1 when performing each of water discharge B, C, D, E and F. It was confirmed that the ratio of the remained water was decreased whenever water drainage was performed. Experiment 4 was finished after water drainage F. FIGS. 6A and 6B are a photograph of a configuration of biomass material before Experiment 4, and a photograph of a configuration of the biomass material after Experiment 4, respectively.

Based on the result of Experiment 4, the regular or irregular water drainage is preferably performed after transferring from the initial condition to the continuation condition. Further, under the continuation condition including: atmosphere having oxygen; and carbon monoxide concentration in the container being equal to or greater than 100 ppm and equal to or less than 500 ppm, the train valve is preferably opened whenever the inner pressure of the container is reached to 1.5 MPa (15 atmospheric pressure), and preferably to 1 MPa (10 atmospheric pressure). By performing such water drainage, drying of the biomass material can be accelerated, and there is an advantage that volume reduction and carbonization of the biomass material are achieved.

TABLE 1

| | Amount of Water Drainage (g) | Amount of Remained Water (g) | Ratio of Remained Water (%) | Remarks (Pressure When Performing Water Drainage) |
|---|---|---|---|---|
| Time of Initiation | 0 | 378.3 | 100 | — |
| A | 33.4 | 344.9 | 91.2 | at approximately 1.0 MPa |
| B | 39.2 | 305.7 | 80.8 | at approximately 0.4 MPa |
| C | 52.2 | 253.5 | 67 | at approximately 0.9 MPa |
| D | 66.6 | 186.9 | 49.4 | at approximately 1.1 MPa |
| E | 59.0 | 127.9 | 33.8 | at approximately 1.0 MPa |
| F | 47.3 | 80.6 | 23.4 | at approximately 1.0 MPa |
| Total | 297.7 | 80.6 | 23.4 | — |

Experiment 5

Figure 7:
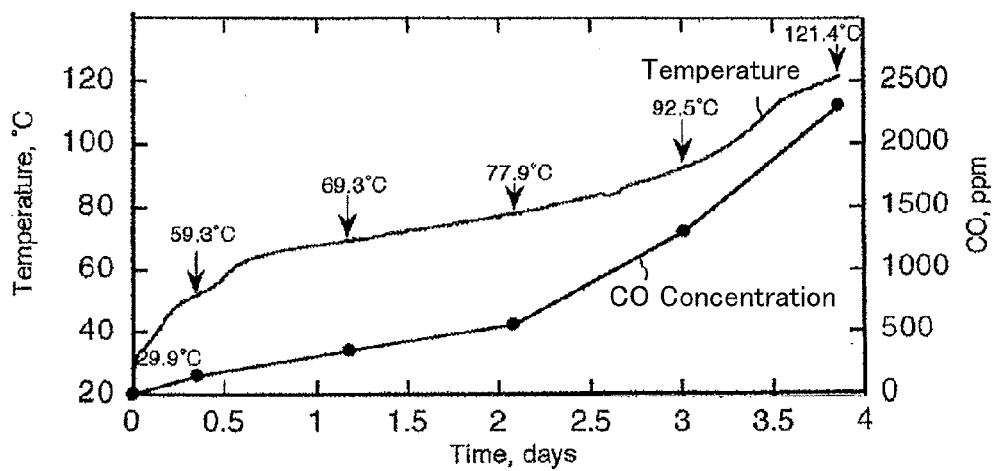
FIG. 7 is a graph indicating changes in temperature at 1 MPa and changes in carbon monoxide concentration when using biomass material of first experiment.

FIG. 7 is a graph indicating changes in temperature in an exothermic reaction at 1 MPa and changes in carbon monoxide concentration in the container when using the biomass material of Experiment 1. The carbon monoxide concentration in the container was increased along with increase in the temperature of the biomass material, and the increase in carbon monoxide concentration at approximately 78 degree Celsius or greater was remarkable. It is understood that the increase in the temperature of the biomass material based on the exothermic reaction occurs when such carbon monoxide exists in the container, and the exothermic reaction of the biomass material along with the increase in temperature of the biomass was not blocked even when the monoxide concentration of the container (for example, 500 ppm, 1000 ppm, 1500 ppm, 2000 ppm, 2500 ppm) was greater than 100 ppm.

Experiment 6

Figure 8:
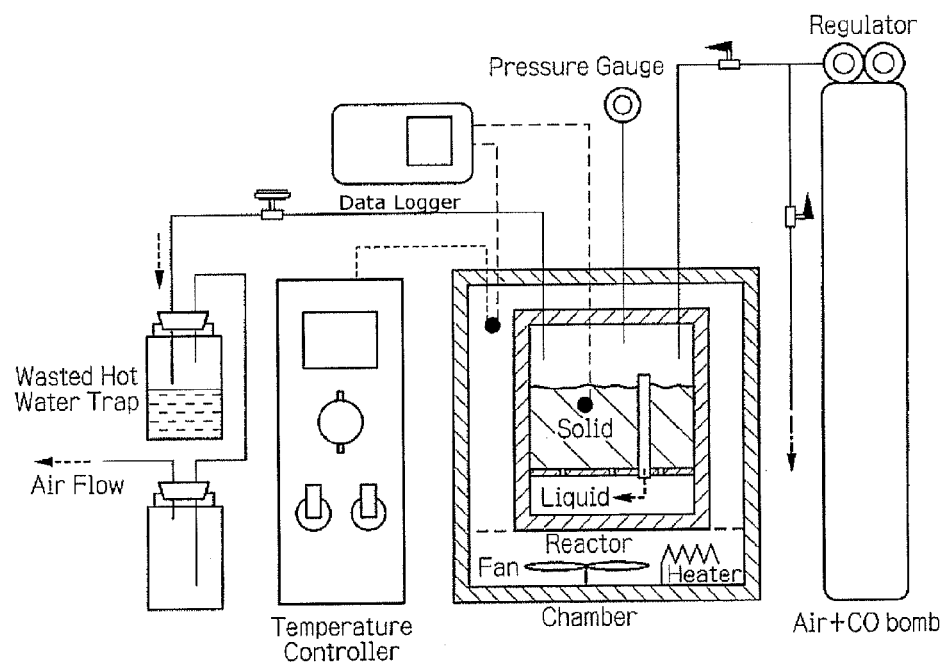
FIG. 8 is a block diagram illustrating the rough configuration of a device used in Experiment 6.

Similar to Experiment 4, household food scraps of 485 g was used as biomass material, and further, the test sample of total 500 g which includes the household scraps and scraps of plastic of 15 g such as bottle caps (polypropylene) of PET bottles, straws, BA-RA-Ns (used in a Sushi lunch box), plastic caps, packing materials (soy sauce plastic bottle and the like) and the like was used. The test sample was placed in a sealed pressure tight stainless container (effective capacity: 0.93 L) of an experiment device indicated in FIG. 8. The container was left out in an insulated chamber, and the temperature in the container was adjusted within ±1 degree Celsius by a T-type thermoelectric couple. After placing the test sample in the container, the test sample in the container was heated under an unsealed condition, and the heating was stopped when the temperature of the test sample reached at 80 degree Celsius. From this point, supply of air into the container from a tank was initiated, and the gaseous phase in the container was uniformized by three time to purge. After closing an exhaust valve, air was re-supplied into the container, and a supply valve was closed when a pressure gauge indicated 1 MPa (approximately 10 atmospheric pressure) in order to even out the pressure (1 MPa) in the container. The concentration of CO is measured by a gas detector (GASTEC, Japan). In the experiment, carbon monoxide was not supplied from a tank.

FIG. 9 is a graph indicating temporal changes in temperature of a test sample. The temperature of the test sample under an initial condition including: atmosphere having oxygen; temperature in a container being 85 degree Celsius; pressure in the container being at 1 MPa, was not increased for a few hours from beginning the experiment, and increase in the temperature continued after that. After four days from beginning the experiment, the temperature of the test sample was reached at 100 degree Celsius, and after that increase in the temperature continued (the experiment was stopped when the temperature of the test sample was reached at 110 degree Celsius).

In Experiment 6, without supply of carbon monoxide from a tank, it was confirmed that the temperature of the test sample was increased. It was assumed that it is why carbon monoxide was generated from the test sample, and carbon monoxide concentration in the container was reached at 100 ppm or greater, while the temperature of the test sample was not increased for about a few hours after reaching at 80 degree Celsius. It can be also explained from a viewpoint in Experiment 5 that there was much carbon monoxide generated from the feces of the milk cow when the temperature of the feces of the milk cow was high. Further, a contrast experiment similar to Experiment 6 was performed by supplying air having carbon monoxide concentration of 60 ppm to the container. As a result, it was confirmed that, as indicated by a broken line in FIG. 9, the term that the temperature was not increased after reaching at 80 degree Celsius was short, and the temperature of the test sample is relatively smoothly increased. It can be also assumed that it is why carbon monoxide was generated, and the carbon monoxide concentration in the container was reached at 100 ppm or greater, while the temperature of the test sample was not increased for about a few hours after reaching at 80 degree Celsius. Additionally, with respect to the two test samples according to two lines indicated in FIG. 9, each of the carbon monoxide concentration in the container was over 2000 ppm (over the range in which CO concentration detecting tube was able to measure CO concentration) when the temperature of the test samples was at 110 degree Celsius.

With the result of FIG. 9, FIG. 10 is a graph indicating one of examples of changes in temperature in an exothermic reaction using the biomass material (feces of a milk cow) under an initial environmental condition including atmosphere in the container which is air (oxygen), temperature in the container which is 50 degree Celsius, and pressure in the container which is 1 MPa, and one of examples of changes in temperature in an exothermic reaction using the test sample of Experiment 6 (kitchen waste) under an initial environmental condition including atmosphere in the container which is air (oxygen), temperature in the container which is 40 degree Celsius and pressure in the container which is 1 MPa. As these results, when using feces of a milk cow and kitchen waste which can easily generates carbon monoxide as biomass material, although the temperature of the biomass material can be gradually increased, as it takes over 25 days to reach to 80 degree Celsius, an extremely long term is needed to reach to 80 degree Celsius. Therefore, by placing biomass material under the initial environmental condition according to the present invention, temperature of biomass material can be extremely speedily increased, and the present invention has an advantage to achieve volume reduction and carbonization of biomass material.

As discussed the above experiments, is was understood that (1) temperature of biomass material can be increased over 80 degree Celsius by setting an initial condition of a container which includes all of atmosphere in the container having oxygen; a temperature range in the container being equal to or greater than 55 degree Celsius and equal to or less than 80 degree Celsius (preferably, equal to or greater than 70 degree Celsius and equal to or less than 80 degree Celsius); a pressure range in the container being over atmospheric pressure and equal to or less than 15 atmospheric pressure; and carbon monoxide concentration being equal to or greater than 100 ppm, when initiating the experiment after placing the biomass material in a container, and (2) volume reduction and carbonization of biomass material can be achieved by maintaining a continuation condition which includes all of: atmosphere in the container having oxygen; pressure range in the container being over atmospheric pressure and equal to or less than 15 atmospheric pressure and; carbon monoxide concentration in the container being equal to or greater than 100 ppm, after the temperature of the biomass material exceeds 80 degree Celsius under the initial condition. Such a method of treating biomass material has possibilities that temperature of all of biomass material having carbon as its substrate can be increased independent of water content ratio of the biomass. Further, is was assumed that an exothermic reaction involves:

$$C + O_2 = CO_2 + 94.1 \text{ kcal}(394.31 \text{ kJ});$$

$$C + \tfrac{1}{2}O_2 = CO + 26.4 \text{ kcal}(110.6 \text{ kJ}); \text{ and}$$

$$CO + \tfrac{1}{2}O_2 = CO_2 + 67.6 \text{ kcal}(283.7 \text{ kJ}).$$

Promising examples of application are a supercritical reaction, and a subcritical reaction.

DESCRIPTION OF SYMBOLS

1 Container
2 Main body
3 Portion for material
4 Cover
5 Leak valve
6 Drain valve
7 Heating device
8 Gas valve
9 Gas control valve
10 Biomass material
11 Filling pipe
11a Hole
12 Bottom plate of a container
13 Bottom portion of a container

The invention claimed is:

1. A method of treating biomass material to achieve volume reduction or carbonization of one type or more of biomass material which is selected from the group consisting of food scraps, livestock excreta, agricultural waste products, marine waste products, and forest waste products in a single pressurizable and heatable container, comprising:

placing the biomass material in the container;
setting an initial condition of the container after placing the biomass material, the initial condition including all of (a) an atmosphere in the container having oxygen, (b) a temperature range in the container being equal to or greater than 55 degree Celsius and equal to or less than 80 degree Celsius, (c) a pressure range in the container being over atmospheric pressure and equal to or less than 15 atmospheric pressure and (d) a carbon monoxide concentration being equal to or greater than 100 ppm;
increasing temperature of the biomass material in the single container over 80 degree Celsius under the initial condition;
setting a continuation condition of the single container after initiating increase in the temperature of the biomass in the single container to over 80 degree Celsius under the initial condition, the continuation condition including all of: (i) the atmosphere in the container having oxygen; (ii) the pressure range in the container being over atmospheric pressure and equal to or less than 15 atmospheric pressure; and (iii) the carbon monoxide concentration in the container being equal to or greater than 100 ppm; and
maintaining the continuation condition of the single container, in order to spontaneously increase temperature of the biomass material over at least 150 degree Celsius, and achieve volume reduction or carbonization of the biomass material.

2. The method of treating the biomass according to claim 1, wherein the biomass material includes organic waste, temperature of which increases to at least 55 degree Celsius based on a reaction due to organic degradation by a microbe in the organic waste by contacting to oxygen.

3. The method of treating the biomass material according to claim 1, wherein a plastic material that has glass-transition temperature, which is equal to or less than 200 degree Celsius, is placed in the container with the biomass material.

4. The method of treating the biomass material according to claim 1, wherein the container comprises a drain valve, a heating device, and a pressure device, and the drain valve drains water on the bottom of the container regularly or irregularly along with the spontaneously increasing temperature of the biomass material.

5. The method of treating the biomass material according to claim 1, wherein the carbon monoxide is supplied to the biomass material from the biomass material itself or from a tank of carbon monoxide.

6. A method of utilizing heat energy, comprising transferring heat generated by the method of treating the biomass material according to claim 1 to another apparatus.

7. A method of utilizing heat energy, comprising transferring heat generated by the method of treating the biomass material according to claim 2 to another apparatus.

8. A method of utilizing heat energy, comprising transferring heat generated by the method of treating the biomass material according to claim 3 to another apparatus.

9. A method of utilizing heat energy, comprising transferring heat generated by the method of treating the biomass material according to claim 4 to another apparatus.

10. A method of utilizing heat energy, comprising transferring heat generated by the method of treating the biomass material according to claim 5 to another apparatus.

* * * * *